United States Patent [19]

Szabo

[11] 3,715,623

[45] Feb. 6, 1973

[54] NETWORK FOR VARYING CURRENT THROUGH A LOAD

[75] Inventor: John Szabo, Breslau, Ontario, Canada

[73] Assignee: Electrohome Limited, Ontario, Canada

[22] Filed: Oct. 18, 1971

[21] Appl. No.: 189,890

[52] U.S. Cl. ...........315/194, 307/252 B, 307/252 N, 315/292

[51] Int. Cl. ...........................G05f 1/00, H05b 37/02

[58] Field of Search ......315/194, 291, 292, 299, 362, 315/DIG. 4, DIG. 7; 307/252 N, 252 B

[56] References Cited

UNITED STATES PATENTS 3,666,988 5/1972 Bellis ...........................307/252 N X

*Primary Examiner*—Roy Lake
*Assistant Examiner*—James B. Mullins
*Attorney*—Peter W. McBurney et al.

[57] ABSTRACT

A sensing device controls an input pulse generator that is connected to the input terminal of one of at least two cascaded bistable devices. The output signals of the bistable devices are decoded and the resultant signal is used in a control circuit for controlling the amount of current flowing in a load dependent upon the decoder signal.

10 Claims, 8 Drawing Figures

INVENTOR.
JOHN SZABO

BY Sim & McBurney
Per: Peter W. McBurney
Reg. No. 19,352

INVENTOR.
JOHN SZABO
BY Sim & McBurney
Per: Peter W. McBurney
Reg. No. 19,352

NETWORK FOR VARYING CURRENT THROUGH A LOAD

This invention relates to networks for controlling the amount of current flowing through a load. More particularly, this invention relates to load current controlling networks employing bistable devices.

While this invention will be described hereinafter as useful for controlling the amount of current flowing through a light bulb, those skilled in the art will appreciate that the load with which a network embodying this invention may be employed may be other than a light bulb. Consequently, this invention is not to be construed as limited in applicability to controlling the illumination of a light bulb.

Bulbs of the trilight type employ two filaments and are used in lamps provided with a special four position switch (off, first filament on and second filament off, second filament on and first filament off, both filaments on). One of the filaments of a trilight bulb usually burns out before the other, so the durability of such a bulb is determined by the filament having the shortest life. Trilight bulbs are more expensive than single filament bulbs, since they require additional filaments and terminals. At the same time, three levels of illumination cannot be obtained from a conventional single filament bulb used in a lamp provided with a trilight switching arrangement.

In accordance with this invention there are provided current controlling networks that can be incorporated into lamps in place of the trilight switches thereof and which can be used to control the amount of current flowing through conventional single filament light bulbs and hence the degree of illumination thereof. Thus, in place of an expensive trilight bulb rated at, say, 50, 100 and 150 watts, a conventional single filament bulb rated at 150 watts can be used and can be operated at 50, 100 or 150 watts. Consequently, whereas it has been the practice in the past to provide trilight illumination using a special bulb and a special switch, this invention eliminates the need for a special bulb.

In brief, in accordance with this invention there is provided a sensing device, which may be a simple switch, which controls an input pulse generator that supplies pulses to two bistable networks so connected that the output terminal of the first is connected to the input terminal of the second. The output signals of the bistable networks are decoded in a decoder that supplies its output signal to a control circuit for controlling the amount of current flowing in a load dependent upon the output signal of the decoder.

This invention will become more apparent from the following detailed description, taken in conjunction with the drawings, in which.

Figure 1:
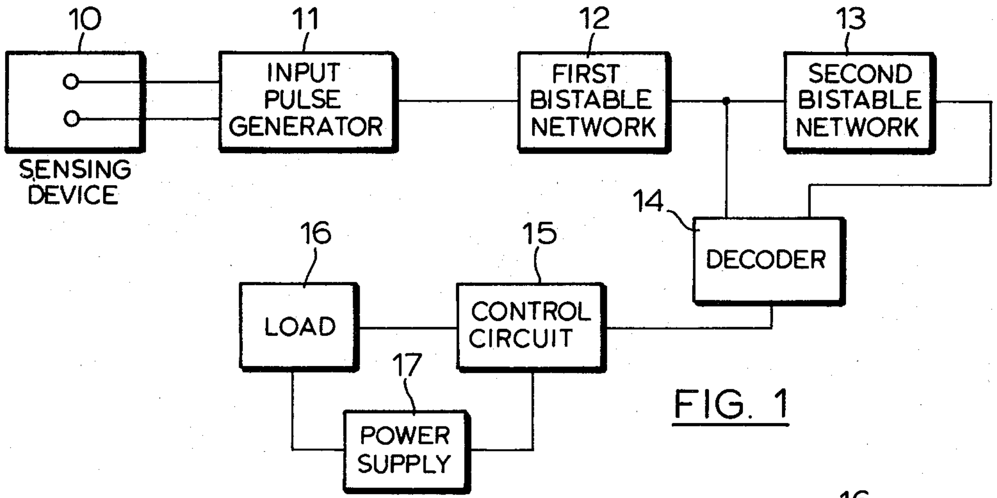
FIG. 1 is a block diagram of a load current controlling network embodying this invention.

Referring to FIG. 1, a network embodying this invention is shown therein and consists of a sensing device 10, an input pulse generator 11, first and second bistable networks 12 and 13 respectively, a decoder 14, a control circuit 15, a load 16 and a power supply 17.

The sensing device may be a simple switch movable between two positions. When moved momentarily from one position to the other position it triggers pulse generator 11 and a pulse is applied to the input terminal of bistable network 12 to change its state. This change in state is reflected in the output signal of bistable network 12 that is applied both to decoder 14 and bistable network 13. No change in state of bistable network 13 results at this time. The output signal of decoder 14 changes to reflect the change in state of bistable network 12 and is applied to control circuit 15 that varies the current passing through load 16 from the power supply from what it was previously to a different amount.

The sensing device now may be operated again causing another pulse from pulse generator 11 to be delivered to bistable network 12. This causes bistable network 12 to revert to its original state, but bistable network 13 now changes state. This change in state is reflected in the output signal of bistable network 13 that is applied to decoder 14. The output signal of decoder 14 changes to reflect the change in state of bistable networks 12 and 13 and is applied to control circuit 15 that varies the current passing through load 16 from what it was just previously to a different amount.

When sensing device 10 is operated again, bistable network 12 changes its state, but bistable network 13 remains in its previous state. The change in state of bistable network 12 is reflected in its output signal and in the change of input to decoder 14. Another change in the output signal of decoder 14 results and this in turn via control circuit 15 changes the load current again.

One more operation of the sensing device causes both bistable networks to revert to their original states and the load current to change again. The last operation on the sensing device may result in the load current being interrupted, while the other three operations of the sensing device may result in progressive increases in load current in three distinct increments such as may be required to dissipate 50, 100 and 150 watts in a light bulb.

While only two bistable networks have been shown in FIG. 1, it will be appreciated that additional bistable networks may be provided if more load current variations are required. The input terminal of each bistable network would be connected to the output terminal of the immediately preceding bistable network, while each output terminal of each bistable network also would be connected to decoder 14.

Figure 2:
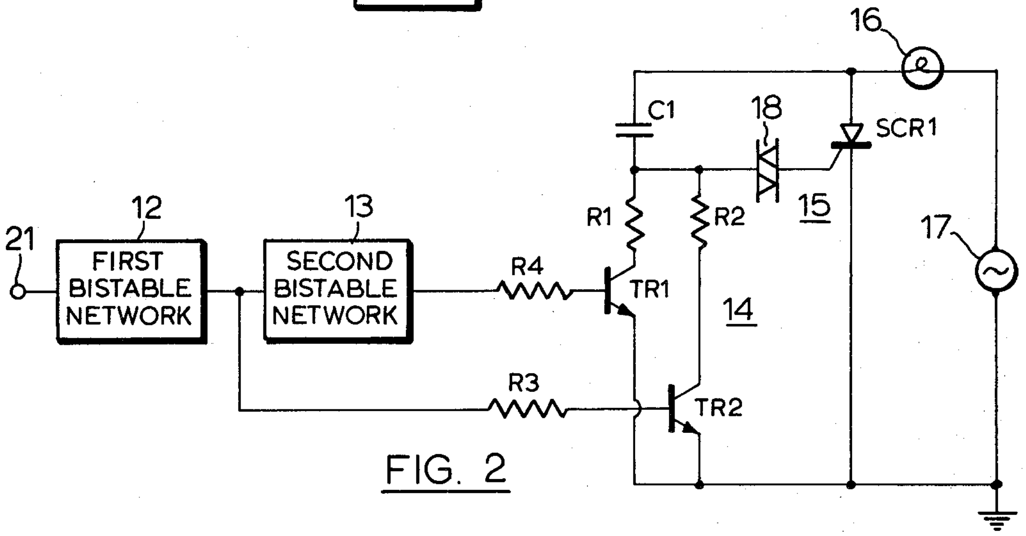
FIG. 2 is a simplified circuit diagram of a network embodying this invention.

Referring to FIG. 2, decoder 14 consists of transistors TR1 and TR2, resistors R1 and R2 and a capacitor C1. Control circuit 15 is a silicon controlled rectifier SCR1 and a bidirectional semiconductor switch 18 connected to the gate electrode of silicon controlled rectifier SCR1. Switch 18 is known as a diac. Power supply 17 is an A.C. source, and load 16 is a light bulb. Sensing device 10 and pulse generator 11 have not been shown for the sake of simplicity.

As shown in the Figure, power supply 17, light bulb 16 and silicon controlled rectifier SCR1 are connected in a series circuit. The amount of current that flows in this circuit is determined by the point in a positive half cycle of the voltage produced by power supply 17 at which silicon controlled rectifier SCR1 fires. This is determined by the decoder.

Referring to the decoder, capacitor C1 has one terminal connected via bulb 16 to one terminal of the power supply and its other terminal connected to the upper terminal of resistors R1 and R2. Resistors R1 and R2 are of unequal magnitude, resistor R2 being larger than resistor R1. The lower terminals of these resistors are connected to the collector electrodes of transistors TR1 and TR2 respectively. The emitter electrodes of these transistors are connected to the grounded terminal of power supply 17. The upper terminals of resistors R1 and R2 also are connected to one terminal of diac 18, while input signals to decoder 14 are derived from bistable networks 12 and 13 and are applied thereto via current limiting and isolating resistors R3 and R4 connected between the output terminals of bistable networks 12 and 13 respectively and the base electrodes of transistors TR2 and TR1 respectively.

Figure 3:
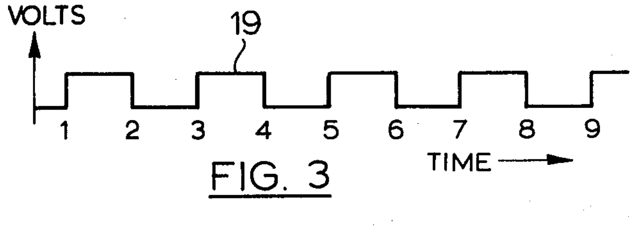
FIGS. 3 and 4 show the output signals of the two bistable networks illustrated in FIG. 2, these signals being plotted on coordinates of voltage and time.
Figure 4:
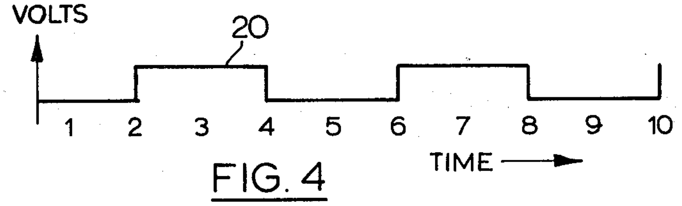

FIGS. 3 and 4 show the output signals 19 and 20 of bistable networks 12 and 13 respectively. Each time a pulse is applied to input terminal 21 of bistable network 12 it changes its state and remains in that state until another pulse is applied to its input terminal. Thus, if a series of pulses are applied to input terminal 21 at times 1, 2, 3, 4, 5 and 6 etc., the output signal of bistable network 12 will be up for time intervals 1 – 2, 3 – 4 and 5 – 6 and 7 – 8 and down for time intervals 2 – 3, 4 – 5, 6 – 7 and 8 – 9.

The input pulse signal for bistable network 13 is the output signal of bistable network 12. Consequently the output signal 20 of bistable network 13 will be up during time intervals 2 – 4 and 6 – 8 and down during time intervals 4 – 6 and 8 – 10.

Just prior to time 1 both transistors TR1 and TR2 will be off making it impossible for silicon controlled rectifier SCR1 to be turned on. Hence there will be no current flowing through light bulb 16. This is the off condition of the light bulb.

At time 1 a pulse is applied to input terminal 21. This changes the state of bistable network 12, but not that of bistable network 13, and a voltage sufficiently large to turn on transistor TR2 is applied via resistor R3 to the base of transistor TR2. Capacitor C1 charges from power supply 17 via bulb 16, resistor R2 and transistor TR2. The time constant of this network is largely determined by the magnitude of resistor R2. At some point in each positive half cycle of the A.C. voltage of power supply 17 capacitor C1 will charge to a potential sufficient to trigger silicon controlled rectifier SCR1, and it will fire permitting load current to flow through it and bulb 16. The bulb will burn with relatively low illumination if resistor R2 has been properly selected.

At time 2 another pulse is applied to input terminal 21. This changes the state of bistable network 12 back to its original state. Transistor TR2 in turn reverts to its original non-conductive state. However, the state of bistable network 13 also changes and a voltage sufficiently large to turn on transistor TR1 is applied via resistor R4 to the base of transistor TR1. Capacitor C1 charges from power supply 17 via bulb 16, resistor R1 and transistor TR1. The time constant of this network is largely determined by the magnitude of resistor R1. Since it is smaller than resistor R2, capacitor C1 will charge more quickly than when it charges via resistor R2, so silicon controlled rectifier SCR1 will fire earlier in each positive half cycle and medium illumination will be obtained from bulb 16.

At time 3 another pulse is applied to input terminal 21. Bistable network 12 changes state, but bistable network 13 remains in its previous state and transistor TR1 remains turned on. The change of state of bistable network 12 turns on transistor TR2, so that the time constant of the charging circuit for capacitor C1 now is determined by the resistance of resistors R1 and R2 in parallel with each other. This is lower than the resistance of either resistor, so capacitor C1 charges more quickly than in either previous case, and silicon controlled rectifier SCR1 fires earlier in each positive half cycle than in either previous case. High illumination is obtained from bulb 16.

At time 4 another pulse is applied to input terminal 21. Both bistable networks return to their original states, transistors TR1 and TR2 turn off and current ceases to flow in the load circuit. The bulb again has returned to its off condition.

The waveforms shown in FIGS. 3 and 4 presuppose the application to input terminal 21 of pulses that reoccur regularly at times 1, 2, 3, 4 etc. Of course, these pulses may occur at any time and are initiated by the operator by operation of sensing device 10 (FIG. 1). Consequently, until the pulse that occurs at time 1 is followed by another pulse, bulb 16 will remain in its state of low illumination.

Figure 5:
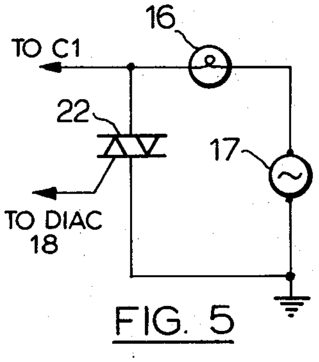
FIG. 5 shows a modification of a part of the network of FIG. 2.

If conduction during both positive and negative half cycles of the A.C. voltage of supply 17 is desired, silicon controlled rectifier may be replaced with a bidirectional controlled semiconductor switch 22 as illustrated in FIG. 5 wherein this device is shown as a triac.

Figures 6, 7, 8:
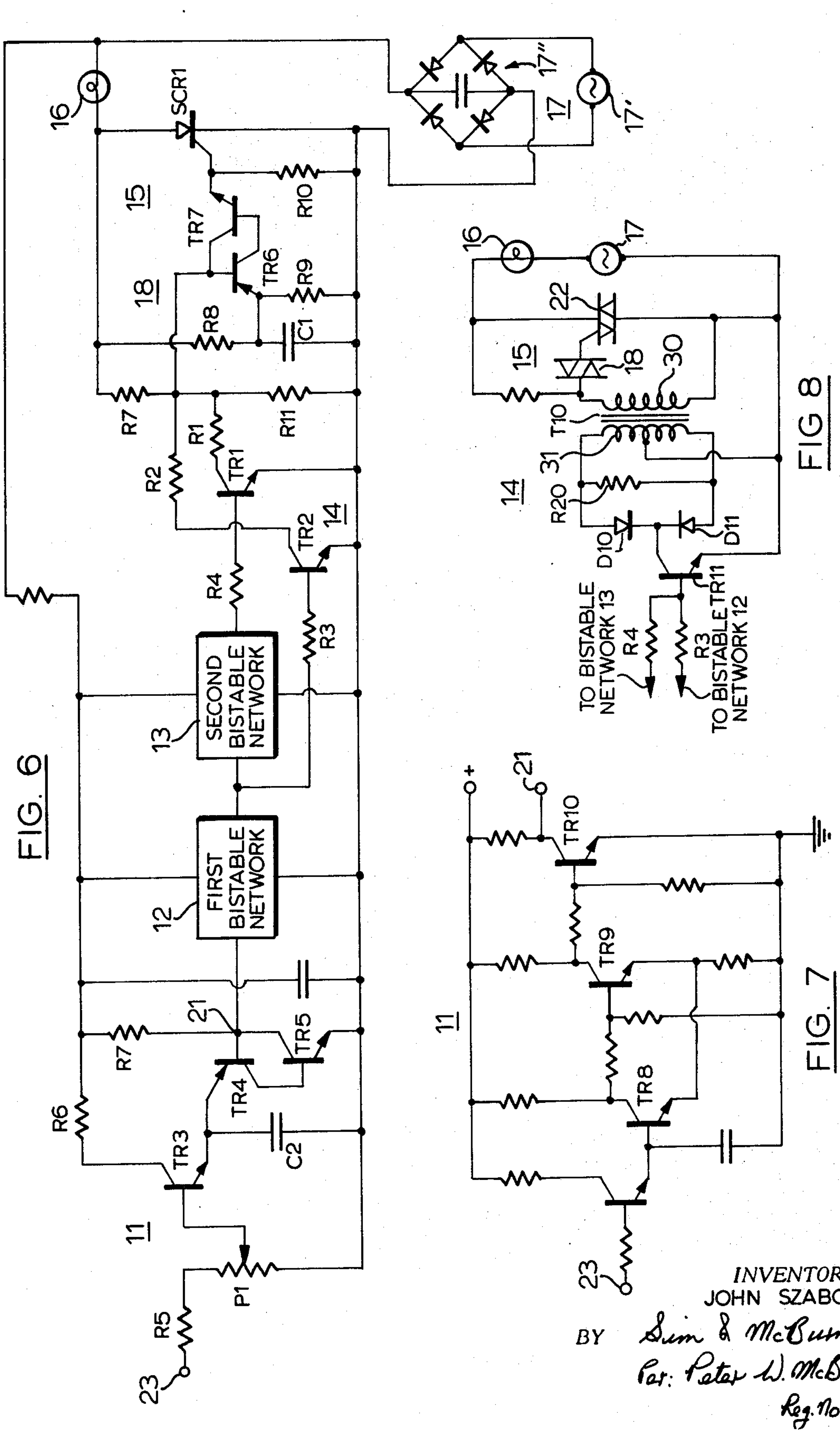
FIG. 6 is a circuit diagram of another embodiment of this invention.
FIG. 7 illustrates a known pulse generator that may be used in conjunction with the network of FIG. 2 or in place of the pulse generator of FIG. 6.
FIG. 8 is a circuit diagram of another embodiment of this invention.

The embodiment of the invention shown in FIG. 6 employs an input pulse generator 11 that consists of transistors TR3, TR4 and TR5, resistors R5, R6 and R7, a potentiometer P1 and a capacitor C2 all connected as shown in the Figure. This pulse generator is known per se and is of a type that will continuously generate time spaced pulses as long as a person's finger is kept on its input terminal 23. In this instance sensing device 10 (FIG. 1) can be considered to be a touch switch.

Decoder 14 of FIG. 6 is somewhat different than the decoder shown in FIG. 2. The common terminals of resistors R1 and R2 are connected via a resistor R7 and bulb 16 to one terminal of the power supply and a resistor R11 is connected between the common terminals of resistors R1 and R2 and the emitter electrodes of transistors TR1 and TR2. A resistor R8 and timing capacitor C1 are connected in series with each other across the series network consisting of resistors R7 and R11.

Semiconductor switch 18 consists of resistors R9 and R10 and transistors TR6 and TR7 connected as shown in the Figure.

Power supply 17 is constituted by an A.C. generator 17' and a full wave rectifier 17''.

The operation of the network of FIG. 6 is essentially the same as that of the network of FIG. 2. It should be noted, however, that voltage controlled switch 18 turns on when the voltage at the emitter electrode of transistor TR6 becomes more positive than the voltage at the base thereof by the base-emitter voltage of the transistor, and the voltage at the base of transistor TR6 varies dependent upon the state of conduction of transistors TR1 and TR2 and their shunting effect on resistor R11. It also should be noted, as stated previously, that pulse generator 11 is of a type that will continue to generate time spaced pulses as long as a person's finger is maintained on input terminal 23. Consequently, bulb 16 will cycle through off, low, medium, high and off etc. until the person's finger is removed, at which point it will remain in one of these states.

Another type of pulse generator that may be employed is shown in FIG. 7 wherein a conventional Schmitt trigger circuit is illustrated. This circuit will not be described in detail as it and its operation are well known. The active transistors of the trigger circuit are transistors TR8 and TR9. Transistor TR10 is an inverting buffer stage that provides negative-going pulses to trigger bistable network 12. The operation is such that each time input terminal 23 is touched, one pulse will be derived and applied to input terminal 21.

The network of FIG. 8 employs a single transistor TR11 in place of transistors TR1 and TR2. A pulse transformer T10 having primary and secondary windings 30 and 31 respectively is provided. A resistor R20 is connected across secondary winding 31 and in turn is shunted by back to back diodes D10 and D11 that provide full wave rectification. The secondary of transformer T10 has a center tap connected to the emitter of transistor TR11. The collector thereof is connected to the junction of diodes D10 and D11.

Transistor TR11 is a variable load in the secondary circuit of transformer T10 and varies the phase angle of the primary voltage and hence the point in a half cycle of the A.C. voltage of source 17 at which triac 22 conducts. Transistor TR11 is turned on least hard by bistable network 12, harder by bistable network 13 and hardest by both bistable networks together resulting in low, medium and high illumination of bulb 16. In this embodiment resistors R3 and R4 have different magnitudes to enable the foregoing to be achieved.

While preferred embodiments of this invention have been disclosed herein, those skilled in the art will appreciate that changes and modifications may be made therein without departing from the spirit and scope of this invention as defined in the appended claims.

What I claim as my invention is:

1. In combination, a source of trigger pulses, at least first and second cascade connected bistable devices each having an input terminal and an output terminal and two stable and different states, means connecting said source of trigger pulses to said input terminal of said first bistable device for applying trigger pulses to said first bistable device to change the state thereof, a decoder having an input terminal means and an output terminal, said decoder having a characteristic that varies in response to variations in input signals applied to said input terminal means thereof, means connecting said output terminals of said bistable devices to said input terminal means of said decoder for applying output signals of said bistable devices to said decoder, a load, means connecting said load in circuit with a source of electrical energy whereby current may flow through said load, and means responsive to variations in said characteristic for varying the amount of current flowing through said load.

2. The invention according to claim 1 wherein said characteristic is the time constant of a resistance-capacitance network.

3. The invention according to claim 2 wherein said decoder includes at least two resistance-capacitance networks each having a different time constant and at least two transistors, one of said transistors being connected in circuit with one of said resistance-capacitance networks and the other of said transistors being in circuit with the other of said resistance-capacitance networks, said output signals of said bistable devices being applied to respective ones of said transistors to turn said transistors on and off and close and open respectively said circuits including said resistance-capacitance networks and said transistors.

4. The invention according to claim 2 wherein said decoder includes a resistance-capacitance network and at least two transistors, said transistors being connected in separate circuits in parallel with said resistance-capacitance network, said output signals of said bistable devices being applied to respective ones of said transistors to turn said transistors on and off and close and open respectively said circuits including said transistors.

5. The invention according to claim 1 wherein said decoder includes a pulse transformer having primary and secondary windings and a transistor, said transistor being connected as a load in circuit with said secondary winding, said output signals of said bistable devices being applied to said transistor to vary the conductivity thereof.

6. The invention according to claim 1 wherein said means responsive to variations in said characteristic for varying the amount of current flowing through said load is a gate controlled switch, said switch being connected in circuit with said load.

7. The invention according to claim 6 wherein said switch is a silicon controlled rectifier.

8. The invention according to claim 6 wherein said switch is a triac.

9. The invention according to claim 1 wherein said load is a light bulb.

10. The invention according to claim 6 wherein said load is a light bulb.

* * * * *